United States Patent [19]

Peters et al.

[11] 4,177,579

[45] Dec. 11, 1979

[54] SIMULATION TECHNIQUE FOR GENERATING A VISUAL REPRESENTATION OF AN ILLUMINATED AREA

[75] Inventors: David L. Peters, Whitney Point; Arthur P. Schnitzer, Vestal; John R. Trzeciak, Binghamton; Brain J. Woycechowsky, Vestal, all of N.Y.

[73] Assignee: The Singer Company, Binghamton, N.Y.

[21] Appl. No.: 889,683

[22] Filed: Mar. 24, 1978

[51] Int. Cl.² .............................................. G09B 9/08
[52] U.S. Cl. ..................................... 35/12 N; 358/104
[58] Field of Search .............. 35/12 N, 10.2; 358/104; 340/27 NA

[56] References Cited

U.S. PATENT DOCUMENTS

| | | | |
|---|---|---|---|
| 3,060,596 | 10/1962 | Tucker et al. | 35/12 N X |
| 3,098,929 | 7/1963 | Kirchner | 35/12 N X |
| 3,418,459 | 12/1968 | Purdy et al. | 35/12 N X |
| 3,439,105 | 4/1969 | Ebeling et al. | 35/12 N X |
| 3,520,994 | 7/1970 | McAfee et al. | 35/10.2 X |
| 3,605,083 | 9/1971 | Kramer | 340/27 NA |
| 3,643,258 | 2/1972 | Balding | 340/27 NA X |
| 3,833,759 | 9/1974 | Yatabe et al. | 35/12 N X |
| 3,911,597 | 10/1975 | Millard et al. | 35/12 N |
| 4,054,917 | 10/1977 | Race | 35/12 N X |

Primary Examiner—William H. Grieb
Attorney, Agent, or Firm—J. Dennis Moore; Richard J. Paciulan; Jeff Rothenberg

[57] ABSTRACT

A simulated view on a viewing surface of a raster scan television display of a changeable illuminated area located on a plane surface is provided. The source of illumination is a cone of light whose apex can be located at any distance from an eyepoint and the plane surface and whose conical surface intersects the plane surface creating the illuminated area. Electronic components determine when a line of sight from the eyepoint through the viewing surface intersects the illuminated area. For each line of sight intersection point lying within the illuminated area, a corresponding illumination is created on the viewing surface.

14 Claims, 13 Drawing Figures

SIMULATION TECHNIQUE FOR GENERATING A VISUAL REPRESENTATION OF AN ILLUMINATED AREA

The Government has rights in this invention pursuant to Contract No. N61339-76-C-0086 awarded by the Department of the Navy.

BACKGROUND OF THE INVENTION

1. Field of the Invention

This invention relates to a method and apparatus for displaying upon a viewing surface an image simulating a plane surface area illuminated by a light source, and more particularly to an image simulating the ground area illuminated by a light source as viewed from an eyepoint within an aircraft.

2. Description of the Prior Art

Use of an aircraft simulator is a modern well known method of training aircraft personnel. In a simulator the trainee is placed in a realistically recreated aircraft environment designed such that the trainee feels he is in and operating an actual aircraft without leaving the ground.

An important element that is used to create this realism is the visual display system. Many training judgments depend on the student's response to a visual cue. During flight operation a pilot views his external environment through his aircraft window. For instance, while taking off and landing he scans the runway and operates his controls to properly maneuver his aircraft.

Many modern simulators utilize the viewing surface of a raster-scanned television display to simulate a window view. The external environment seen by the pilot as he looks out the window is produced as the beam of the television cathode ray tube traces the raster across the viewing surface.

The input image to the television display can be generated in a number of different well known ways. Prior art camera model image generation systems use a TV camera and an optical probe which are positioned over a scale model of a simulated terrain. The probe views the model board and the TV camera records the image which is then processed and displayed on the CRT. The accuracy of the display created depends to a large extent on the accuracy of the model board viewed.

Prior art Synthetic Terrain Generators (STG) create an artificial scene on the television display by electronic means. Current STG methods, as described in U.S. Pat. Nos. 3,911,597 and 4,054,917, utilize a fixed pattern of intersecting grid lines on a ground plane. This intersecting pattern of grid lines is by its very nature a synthetic representation of an actual ground surface and is not an accurate real life situation as would be seen by one looking through an aircraft window.

Most aircraft employ landing lights and spot lights. They are typically located at some point distant from the pilot, on the wings or the belly of the aircraft, for example. The source of the directed beam of light produced by these lights can be either fixed to the body of the aircraft or rotatable relative to the body of the aircraft. These lights aid the pilot during night operation by providing ground illumination. Both geographical references and altitude cues are provided. Landmarks become more clearly defined during runway approaches. Some aircraft, helicopters in particular, find search lights extremely important where landing and taking off from confined landing areas are required.

Prior art simulators impose a burden on trainees learning night operations by not providing an accurate simulation of an illuminated ground area.

In the prior art camera model system this ground illumination was simulated by attaching a light to the probe. This rigidly mounted light is not servo-controlled and thereby does not properly respond to a simulated aircraft's pitch, roll, and altitude changes. Also, since the scale factor of the model board is typically 1,000:1, the placement of the attached light cannot be made to correspond to the actual displacement between an aircraft mounted light and the simulated eyepoint, since the physical dimensions of the probe are too large for properly scaled placement.

Furthermore, a unique characteristic produced by the directed beam of light, namely the change in shape of the illuminated ground area during changes in aircraft attitude and position, is not provided. A directed beam of light from a light source, as would be the case with landing lights or search lights, is typically represented as a cone of light. As an aircraft changes its attitude and position the ground area illuminated by this cone of light will change its shape since the cone of light will be seen to be intersecting the ground from a new direction. The probe-mounted light does not allow for these illuminated area changes.

Prior art synthetic terrain generators, as previously mentioned, only provide a synthetic display of a fixed pattern of intersecting grid lines. Changes in this fixed pattern of grid lines can occur with changes in the aircraft's attitude and position relative to the grid pattern. However, no provision is found in the STG's whereby a changeable illuminated ground area generated by a fixed or rotatable source of light can be produced. Existing STG's do not simulate terrain illumination.

With aircraft and other type simulators being extensively used as training devices, a need arises for simulation systems that have a high degree of realism. Proper training requires accurate visual systems. It therefore becomes particularly necessary in those simulators which are recreating directed beams of light illuminating a plane surface that a visual system be provided which has an accurate simulation of this significant visual cue.

SUMMARY OF THE INVENTION

It is therefor a principal object of the present invention to provide a simulated view of a plane surface illuminated by a light source located at any distance from the eyepoint and plane surface.

It is another object of the present invention to provide a simulated view of a ground area illuminated by a light source located aboard an aircraft, where the ground area illuminated can change its shape corresponding to changes in the attitude or position of the aircraft or changes in the direction of a rotatable beam of light controlled by the aircraft operator.

It is another object of the present invention to provide a simulated view of a ground area illuminated by a light source located aboard an aircraft where the ground area illuminated will change its intensity proportional to the distance of the light source above the ground area.

It is still another object of the present invention to provide no ground area illumination when the beam of light is directed toward the horizon or beyond a predetermined level above the ground area.

According to the present invention, first signals representative of changeable relative geometrical relationships between locations and orientations of a plane surface, an eyepoint, and a cone of light are generated. Second signals, representative of the position on a viewing surface of a raster scanned television display of a line of sight from the eyepoint through the viewing surface to an intersection point on the plane surface are also generated. These first and second signals are combined in such a manner that a third signal is generated representative of the location of the line of sight plane surface intersection point relative to a changeable conic section generated by the intersection of the cone of light with the plane surface. A signal comparator responsive to the third signal then determines whether the plane surface intersection point lies within or outside the conic section. Video processing of the raster scanned display would then create an illuminated area on the viewing surface corresponding to the plane surface intersection point when the intersection point lies within or on the conic section.

The foregoing and other features and advantages will become more apparent in light of the following detailed description of the preferred embodiment thereof as illustrated in the accompanying drawings.

DETAILED DESCRIPTION

Figure 1A:
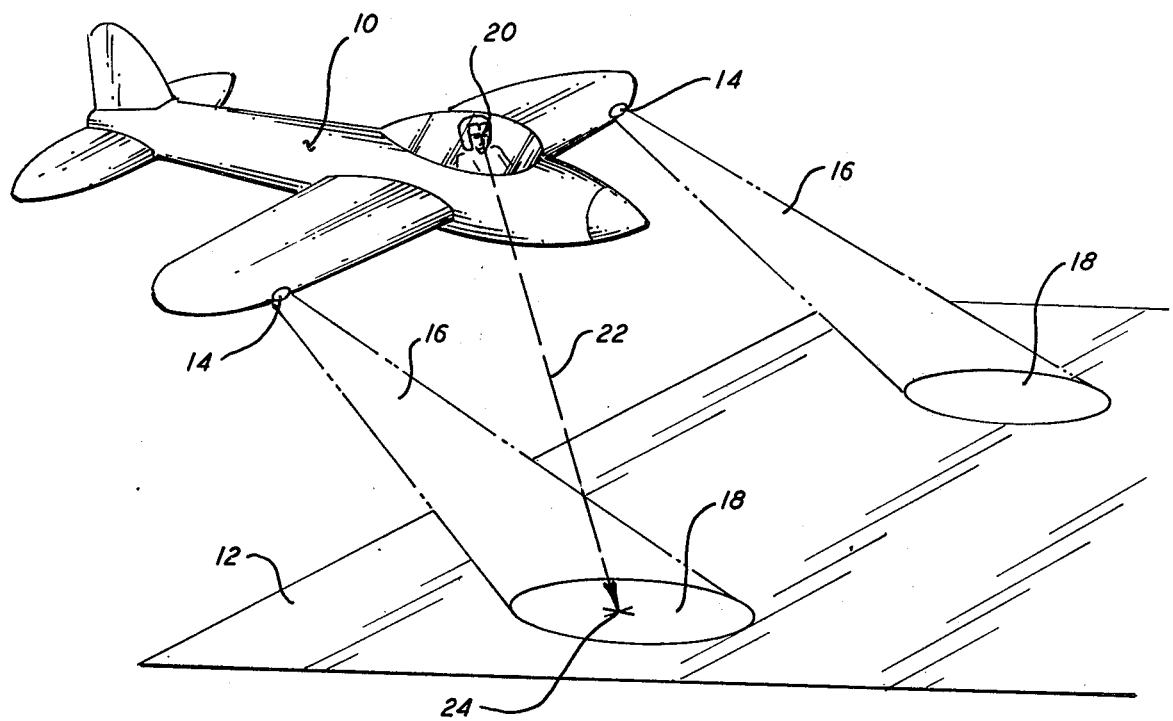
FIGS. 1A, 1B and 1C illustrate an aircraft environment which the present invention can simulate.

Referring to FIG. 1A an aircraft 10 is seen approaching a runway 12. Located on each wing of the aircraft are landing lights 14. Each of these landing lights directs a beam of light 16 toward the surface plane of the runway. The beam of light illuminates the runway at surface areas 18. The pilot's eyepoint 20 in the aircraft will view the illuminated area as represented by a line of sight 22 from the pilot's eyepoint to the ground plane intersection point 24 on the runway. The pilot will then use what he sees in making his landing judgments.

Figure 1B:
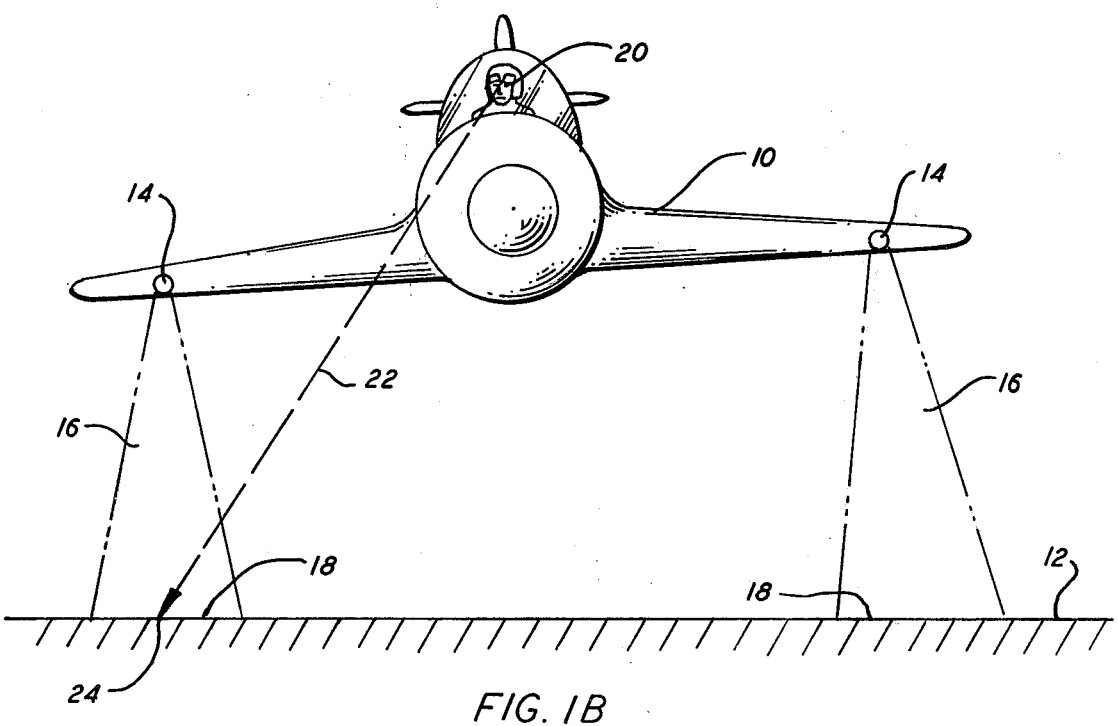

FIG. 1B shows the same aircraft, lights, and runway as shown in FIG. 1A but viewed from a head-on perspective.

Figure 1C:
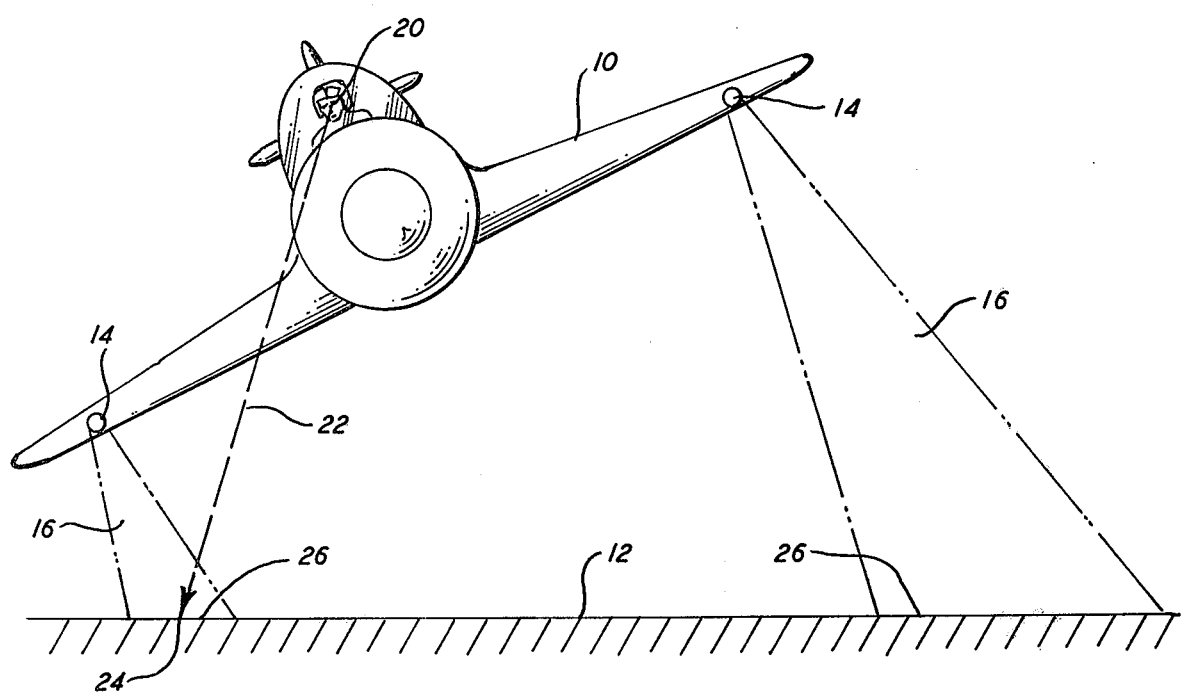

FIG. 1C shows the aircraft of FIG. 1B but the aircraft has now rolled so that it is approaching the runway with one wing closer to the ground plane than the other wing. As the aircraft rolls it can be seen that the beams of light 16 have changed their direction and are now illuminating the runway at surface areas 26. As the pilot's line of sight 22 focuses on the illuminated areas 26 he will detect that the size and shape of the illuminated areas have changed. Using these changing illumination patterns the pilot can make accurate judgments and adjust his controls to accomplish his flight objectives. The trainee in the simulator must be able to make these same judgments and adjustments by viewing the simulator display.

Modern high speed analog and digital electronic circuitry which when combined in accordance with the present invention can present on the viewing surface of a raster scanned television display a simulated view of a ground area illuminated by a light source. This is accomplished by comparing electronically the line of sight intersection of a ground surface with the geometrical shape of the illuminated area located on the ground surface. When the line of sight ground plane intersection point is within the illuminated area, a corresponding illumination will be produced upon the raster scanned CRT.

Prior art STGs as described in U.S. Pat. Nos. 3,911,597 and 4,054,917 electronically compare a line of sight intersection at a ground surface with a fixed pattern of intersecting grid lines located on the ground plane. When the line of sight intersects a grid line a corresponding point will be produced upon a raster scanned CRT. The STGs are essentially concerned with the eyepoint-to-ground line of sight and a fixed grid pattern located on the ground. The grid pattern will not change its shape on the ground plane. The only changes that occur in the STG are aircraft attitude and position changes which only effect the eyepoint-to-ground line of sight.

When a light source, such as a searchlight or a landing light located aboard an aircraft, for example, is to be simulated complicating factors become readily apparent. In addition to changes that occur due to line of sight changes caused by aircraft attitude and position changes, the location of the source of light relative to the eyepoint must be considered. The changes in the direction of the beam of light as the attitude and the position of the aircraft changes, or as the light source is rotated by the pilot, must be determined. The relationship of the beam of light with respect to the plane surface being illuminated must also be developed. It is the essence of the present invention to overcome these complications not solved by the prior art.

In order to show the function of electronic circuitry used to create a simulated view, geometrical relationships between locations and orientations of the ground plane, eyepoint, window display, and beam of light must be considered. Each of these four elements are expressed in terms of its own mathematical orthogonal coordinate system. Each of the element locations with respect to its own coordinate system will then be transformed so that the location and orientation of the eyepoint, window, and light beam will be expressed in terms of the coordinate system associated with the ground plane.

Figure 2:
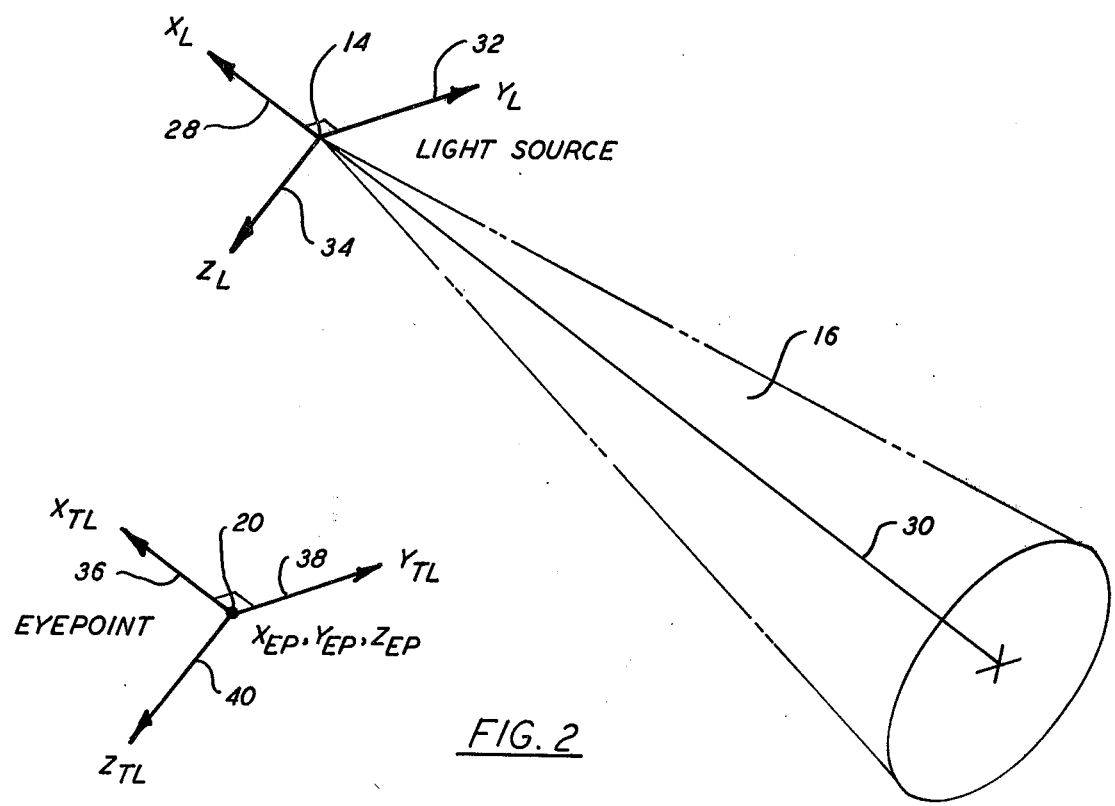
FIG. 2 is an illustration of the relationship of a cone of light and an eyepoint.

First, consider the relationship of the light beam relative to the eyepoint of a pilot within an aircraft, for example. Referring to FIG. 2, it will be seen that the directed beam of light 16 is typically represented as a right circular cone, with a source 14 of the directed beam of light displaced from the eyepoint 20. This displacement can correspond to a typical location of landing lights or searchlights distant from the pilot as shown in FIGS. 1A to 1C. Light sources can be located at any position on the aircraft and are not restricted to the wing mounting as illustrated in FIGS. 1A to 1C. For simplicity of explanation, and sake of clarity, only one source of light will be described.

An axis system can be associated with the directed beam of light. As shown in FIG. 2, the origin of this axis system is at source 14 of the directed beam of light 16. An $X_L$ axis 28 is coincident with the central axis 30 of the directed beam of light. A $Y_L$ axis 32 and a $Z_L$ axis 34 are defined such that the axes constitute a right-handed orthogonal triad of axes. This axes system is named the light axes. The light axes coordinates of a point on the surface of the right circular cone used to represent the directed beam of light are any light axes coordinates which satisfy equation (1):

$$Y_L^2 + Z_L^2 = a^2 X_L^2 \tag{1}$$

where: a is the tangent of the ½ angle of the cone and can be determined for a particular light source knowing the physics of the light beam being transmitted.

Still referring to FIG. 2, a second axes system, named the translated light axes system, has an origin at eyepoint 20 and axes parallel to the light axes. Axis $X_{TL}$ 36, axis $Y_{TL}$ 38, and axis $Z_{TL}$ 40 define the translated light axes. Coordinates $(X_L, Y_L, Z_L)$ are related to $(X_{TL}, Y_{TL}, Z_{TL})$ by the position of the design eyepoint with respect to the light source. If $(X_{EP}, Y_{EP}, Z_{EP})$ denotes the light axes coordinates of the eyepoint 20, then an equation (2) can be expressed as:

$$(X_L, Y_L, Z_L) = (X_{EP}, Y_{EP}, Z_{EP}) + (X_{TL}, Y_{TL}, Z_{TL}) \tag{2}$$

Substitution of equation (2) into equation (1) yields equation (3):

$$(Y_{EP} + Y_{TL})^2 + (Z_{EP} + Z_{TL})^2 = a^2 (X_{EP} + X_{TL})^2 \tag{3}$$

or, expanding terms, yields equation (4):

$$Y_{TL}^2 + 2Y_{EP}Y_{TL} + Y_{EP}^2 + Z_{TL}^2 + 2Z_{EP}Z_{TL} + Z_{EP}^2 = a^2(X_{TL}^2 + 2X_{EP}X_{TL} + X_{EP}^2) \tag{4}$$

The cone has now been defined in terms of a known distance from the eyepoint 20 to the light source 14 as expressed in terms of the translated light axes coordinates.

Figure 3:
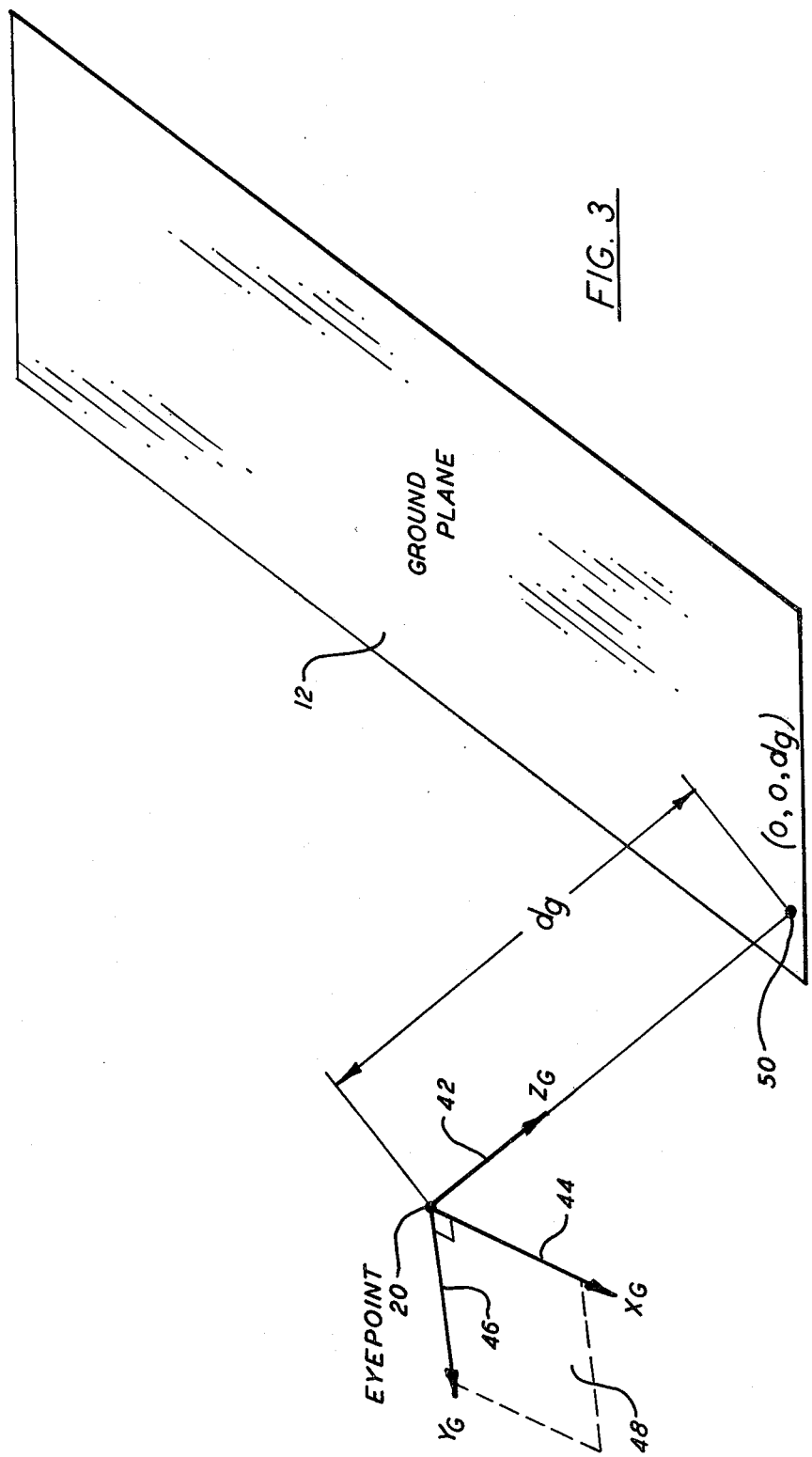
FIG. 3 is an illustration of the relationship of an eyepoint with a ground plane.

A next consideration is the relationship of the eyepoint relative to a plane surface. As shown in FIGS. 1A to 1C, eyepoint 20 views runway 12, which, can be typically represented by a two-dimensional plane. For clarity, the discussion will be concerned with a ground plane but any plane surface oriented in any direction can be employed. The eyepoint to ground plane relationship is determined by the attitude and position of the aircraft above the ground, which are known values. Referring to FIG. 3, a ground axis coordinate system can be defined with its origin at eyepoint 20, its $Z_G$ axis 42 perpendicular to the ground plane 12, and its $X_G$ axis 44 and $Y_G$ axis 46 forming a plane 48 which is parallel with ground plane 12. The location of the eyepoint 20 can then be defined as being at a point $d_g$ distant from the intersection point 50 of the $Z_G$ axis at the ground plane. The coordinates of point 50 expressed in terms of the ground axis system are $(0, 0, d_g)$. The coordinates of the translated light axis system shown in FIG. 2 can be rotated into the ground axes system coordinates by using ground axes to light axis direction cosines. This rotation is well known to those skilled in the art and can be expressed by the following equation (5):

$$\begin{bmatrix} X_{TL} \\ Y_{TL} \\ Z_{TL} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} X_G \\ Y_G \\ Z_G \end{bmatrix} \tag{5}$$

where: the $a_{ij}$ terms are the ground axes to light axes direction cosines.

Substitution of equation (5) into equation (4) with $Z_g = d_g$ yields equation (6):

$$A X_G^2 + B Y_G^2 + C X_G Y_G + D X_G + E Y_G + F = 0 \tag{6}$$

where:

$$\begin{aligned}
A &= a_{21}^2 + a_{31}^2 - a^2 a_{11}^2 \\
B &= a_{22}^2 + a_{32}^2 - a^2 a_{12}^2 \\
C &= 2(a_{21}a_{22} + a_{31}a_{32} - a^2 a_{11}a_{12}) \\
D &= 2(d_g(a_{21}a_{23} + a_{31}a_{33} - a^2 a_{11}a_{13}) \\
&\quad + (Y_{EP}a_{21} + Z_{EP}a_{31} - a^2 X_{EP}a_{11})) \\
E &= 2(d_g(a_{22}a_{23} + a_{32}a_{33} - a^2 a_{12}a_{13}) \\
&\quad + (Y_{EP}a_{22} + Z_{EP}a_{32} - a^2 X_{EP}a_{12})) \\
F &= (a_{23}^2 + a_{33}^2 - a^2 a_{13}^2) d_g^2 \\
&\quad + 2 d_g(Y_{EP}a_{23} + Z_{EP}a_{33} - a^2 X_{EP}a_{13}) \\
&\quad + Y_{EP}^2 + Z_{EP}^2 - a^2 X_{EP}^2
\end{aligned}$$

Figure 4:
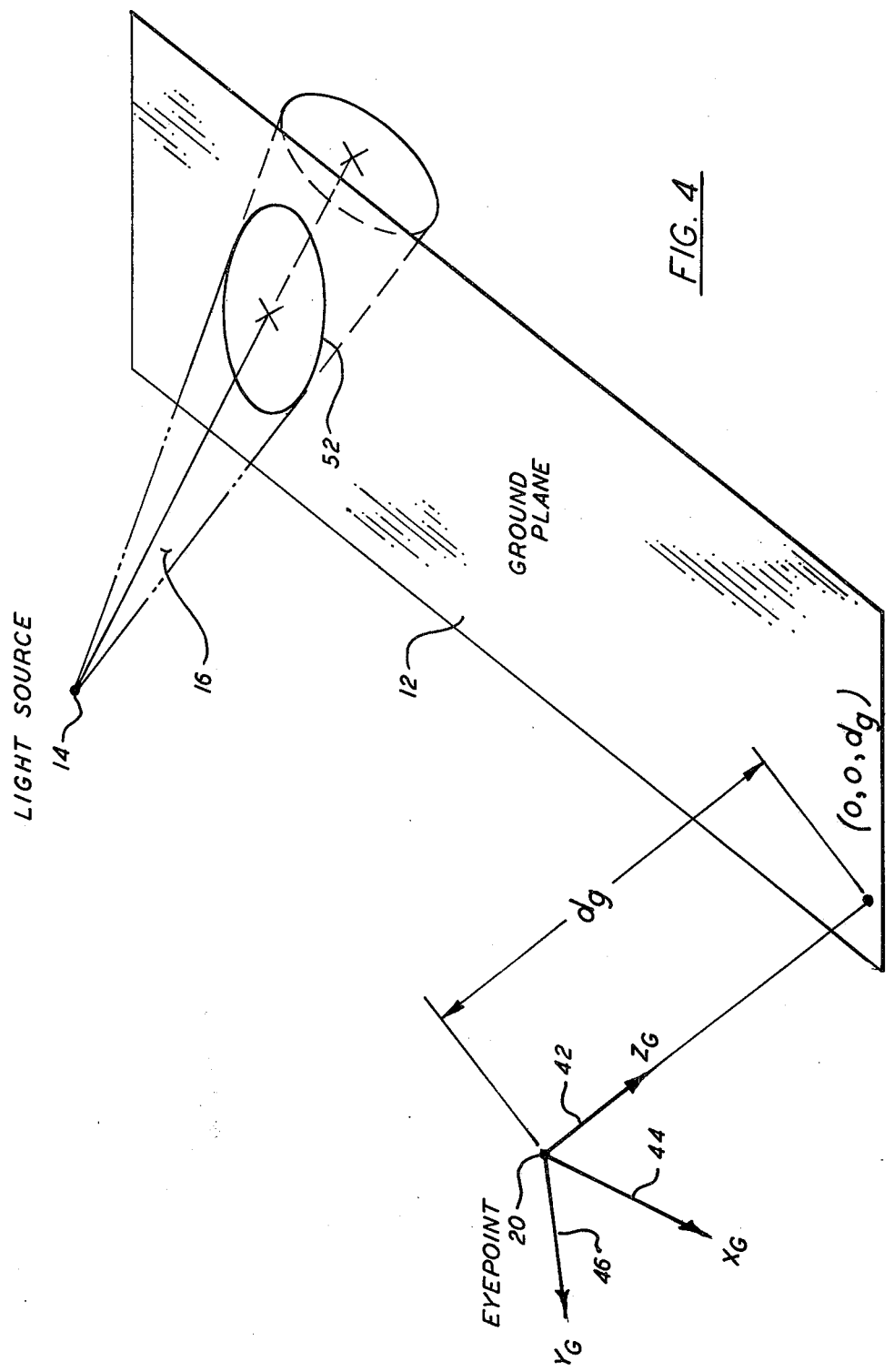
FIG. 4 is an illustration of the relationship of a cone of light, an eyepoint, and a ground plane.

Equation (6) as shown with reference to FIG. 4, defines, in terms of ground axes coordinates $X_G$ 44, $Y_G$ 46, and $Z_G$ 42 whose origin is eyepoint 20, a conic section 52 created by the intersection of cone of light 16 with ground plane 12. Equation (6) is the general equation for a conic section. Points on the ground plane lie within or on the conic section defined by the intersection of the cone of light with the ground plane when equation (7) is satisfied:

$$A X_G^2 + B Y_G^2 + C X_G Y_G + D X_G + E Y_G + F \leq 0 \tag{7}$$

Otherwise, ground plane points lie outside the illuminated ground plane surface. If the term T defines the quantity expressed on the left side of equation (7) then:

$$T = A X_G^2 + B Y_G^2 + C X_G Y_G + D X_G + E Y_G + F \tag{8}$$

where $T < 0$ for points within the conic section 52 and $T = 0$ for points on the conic section 52.

A relationship between the eyepoint, the cone of light and the ground plane has been determined. This relationship must now be extended to include the location of a window which will be simulated by the viewing surface of a raster scanned television display. The window is situated between the eyepoint and the ground plane surface that is being observed, as would be the case where a pilot is looking out an aircraft window.

Figure 5:
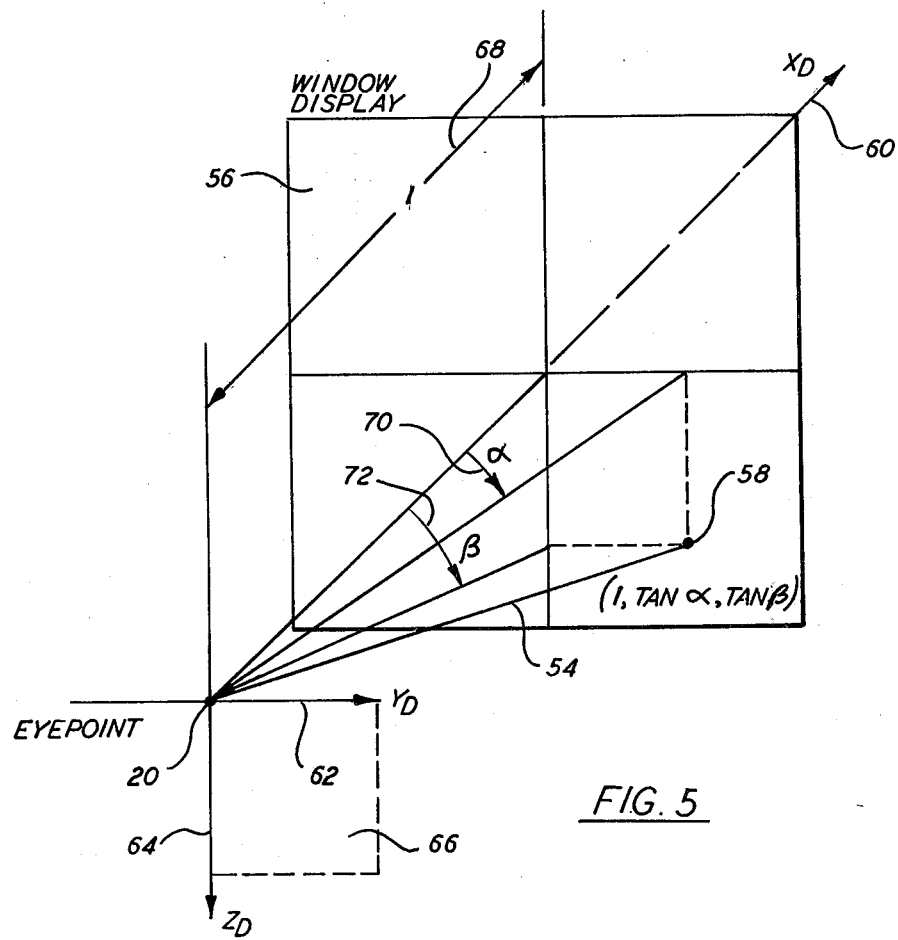
FIG. 5 shows the relationship of an eyepoint and a window display.

Referring to FIG. 5, a line of sight 54 from eyepoint 20 intersects window plane 56 at point 58. A window display axes system can be defined so that point 58 is expressed relative to eyepoint 20. Axis $X_D$ 60 will extend from an origin at eyepoint 20 and will be perpendicular to window 56. Axis $Y_D$ 62 and axis $Z_D$ 64 will form a plane 66 which is parallel to the plane of window 56. If the distance 68 between plane 66 and window plane 56 is considered a nominal distance 1, then an angle α 70 defining the point 58 location along the $X_D$ axis and angle β 72 defining the point 58 location along the $Z_D$ axis can establish point 58 as being located at coordinates (1, tan α, tan β).

Figure 6:
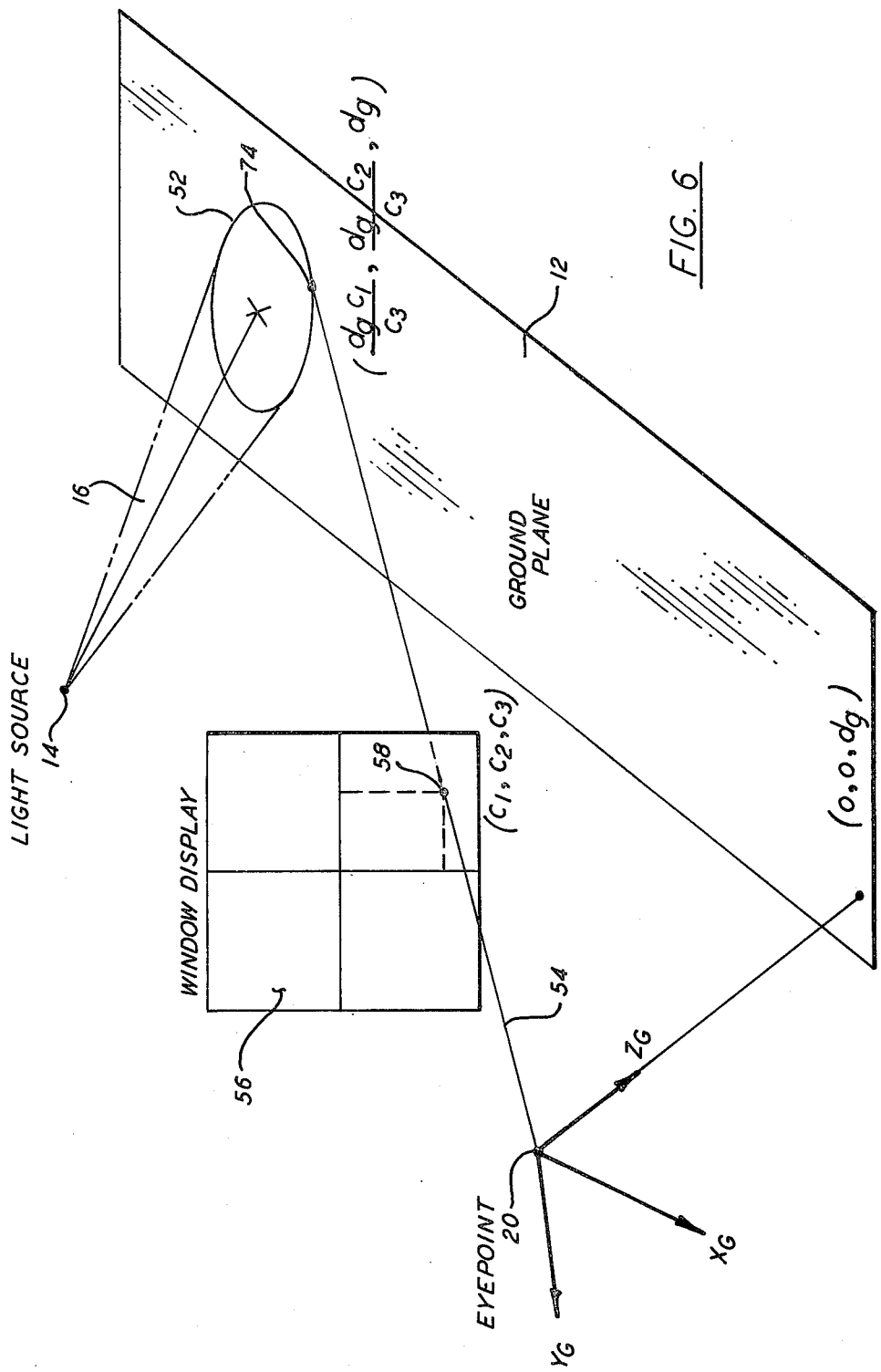
FIG. 6 is a view of a line of sight from an eyepoint, through a window display to a ground plane which is illuminated by a light source.

Referring to FIG. 6, the view from an eyepoint 20 extends via line of sight 54 through window 56 at point 58 and will intersect ground plane 12 at some point 74. Point 74 is shown as intersecting the conic section 52 but can be located at any other point on the ground plane when the size of the window permits a line of sight to pass to that other ground area. So as to express all elements in terms of a ground axis coordinate system the window point 58 must be transformed from the display axes coordinates to ground axes system coordinates. This rotation is again well known to those skilled in the art and is accomplished by the following equation (9):

$$\begin{bmatrix} C_1 \\ C_2 \\ C_3 \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} 1 \\ \tan \alpha \\ \tan \beta \end{bmatrix} \quad (9)$$

where $C_1$, $C_2$, $C_3$ are ground axes system direction numbers representing the line of sight as it intersects the window display viewing surface, and the $b_{ij}$ terms are the display axes to ground axes direction cosines.

By using similar triangles the ground axes system coordinates of point 74 can be expressed as coordinates:

$$\left( \frac{d_g C_1}{C_3}, \frac{d_g C_2}{C_3}, d_g \right).$$

In order to determine whether the ground plane intersection point 74 lies within or on conic section 52 the ground plane coordinates of point 74 are substituted into equation (8) yielding equation (10):

$$T = \frac{A d_g^2 C_1^2}{C_3^2} + \frac{B d_g^2 C_2^2}{C_3^2} + \frac{C d_g C_1 C_2}{C_3^2} + \frac{D d_g C_1}{C_3} + \frac{E d_g C_2}{C_3} + F \quad (10)$$

For hardware convenience, without destroying the mathematical equation, Equation 10 is multiplied through by $C_3^2$ and divided through by the maximum value G of the terms ($Ad_g^2$, $Bd_g^2$, $Cd_g^2$, $Dd_g$, $Ed_g$, and F). Collecting terms yields equation (11):

$$T = \pi_1 C_1^2 + \pi_2 C_2^2 + \pi_3 C_1 C_2 + \pi_4 C_1 C_3 + \pi_5 C_2 C_3 + \pi_6 C_3^2 \quad (11)$$

where:
$\pi_1 = A\, d_g^2 \div G$
$\pi_2 = B\, d_g^2 \div G$
$\pi_3 = C\, d_g \div G$
$\pi_4 = D\, d_g \div G$
$\pi_5 = E\, d_g \div G$
$\pi_6 = F \div G$ Equation (11) represents the relationship between the location of the line of sight ground plane intersection point and the changeable conic section generated by the intersection of the cone of light with the ground plane. When the ground plane intersection point 74 causes term T of equation (11) to be less than or equal to zero (T≦0) the point 74 will be within the illuminated ground area.

Figure 7:
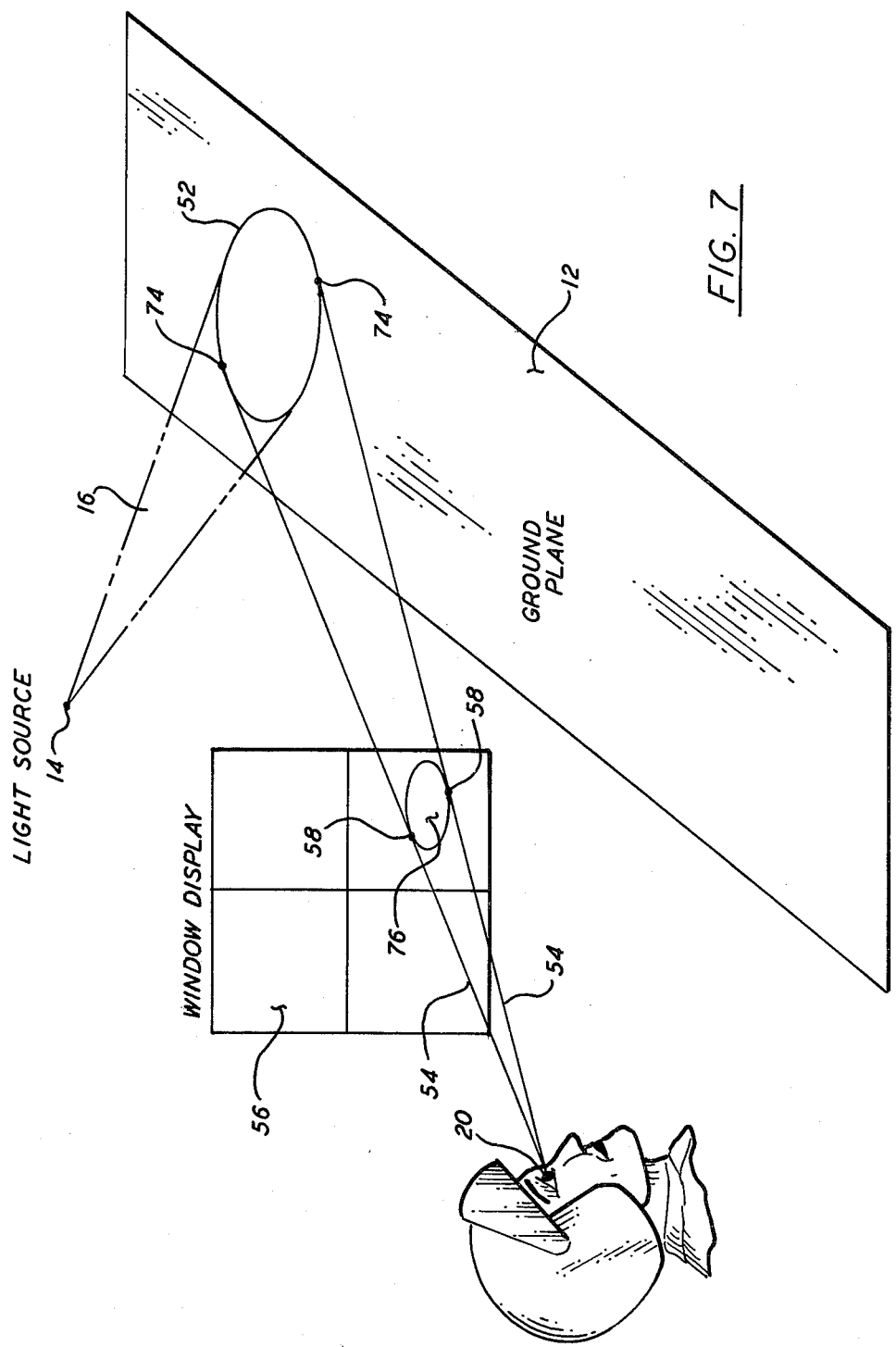
FIG. 7 illustrates the simulated image of the illuminated ground plane area when viewed on the window display.

Referring to FIG. 7, it can be seen that a source of light 20 directs a beam 16 such that it intersects a ground plane 12 creating a section 52 which is indicative of the area illuminated by the light source. An eyepoint 20 of a pilot in an aircraft will see the surface 52 as projected onto window display 56 as a surface 76, such surface on the window being defined by intersection points 58 of lines of sight 54.

In the preferred embodiment well known electronic components are interconnected to generate signals representative of the terms of equation (11). The signals are combined to produce an electronic representation of the value T. It is then determined whether T≦0. If T is ≦0 then a signal is transmitted to video processing equipment so that the raster-scanned window display 56 can produce a point 58 on the viewing surface representative of a point 74 illuminated on the ground plane.

To solve equation (11) the terms $C_1$, $C_2$, $C_3$, $\pi_1$, $\pi_2$, $\pi_3$, $\pi_4$, $\pi_5$ and $\pi_6$ must be developed.

The $C_1$, $C_2$, $C_3$ terms are representative of the position on the viewing surface of a line of sight from the eyepoint through the viewing surface to the ground plane. The $\pi_i$ terms as expressed in equation (11) and subequation (6) are representative of changeable relative geometrical relationships between the location of the ground plane, eyepoint, and cone of light. As shown by equation (9) the $C_1$, $C_2$, $C_3$ terms are developed by generating window display coordinates (1, tan α, tan β) and display axes to ground axes direction cosines, $b_{ij}$.

The display coordinates relate to the tracing of an array of equally spaced horizontal lines across the CRT screen by the beam of a CRT. Sweep generators are well known in the art and can generate tan α and tan β, where α and β vary at raster sweep speeds. The constant term 1 can also be produced by a simple voltage source. Different magnitudes of the constant term can be used in practice but the value 1 will be used to simplify discussion. The $b_{ij}$ terms and the $\pi_i$ terms are all related to known values regarding the aircraft attitude, the eyepoint location, the distance from eyepoint to cone of light, and their relationships relative to the various coordinate systems.

Modern simulators utilize digital computers to determine known values of the environment of the aircraft and the associated geometry and store this information for use by many of the electrical networks used by the simulator. For instance, a simulated altimeter indication must respond to computer information providing altitude data. In like fashion the $b_{ij}$ terms and $\pi_i$ terms are digital computer generated values.

Figure 8:
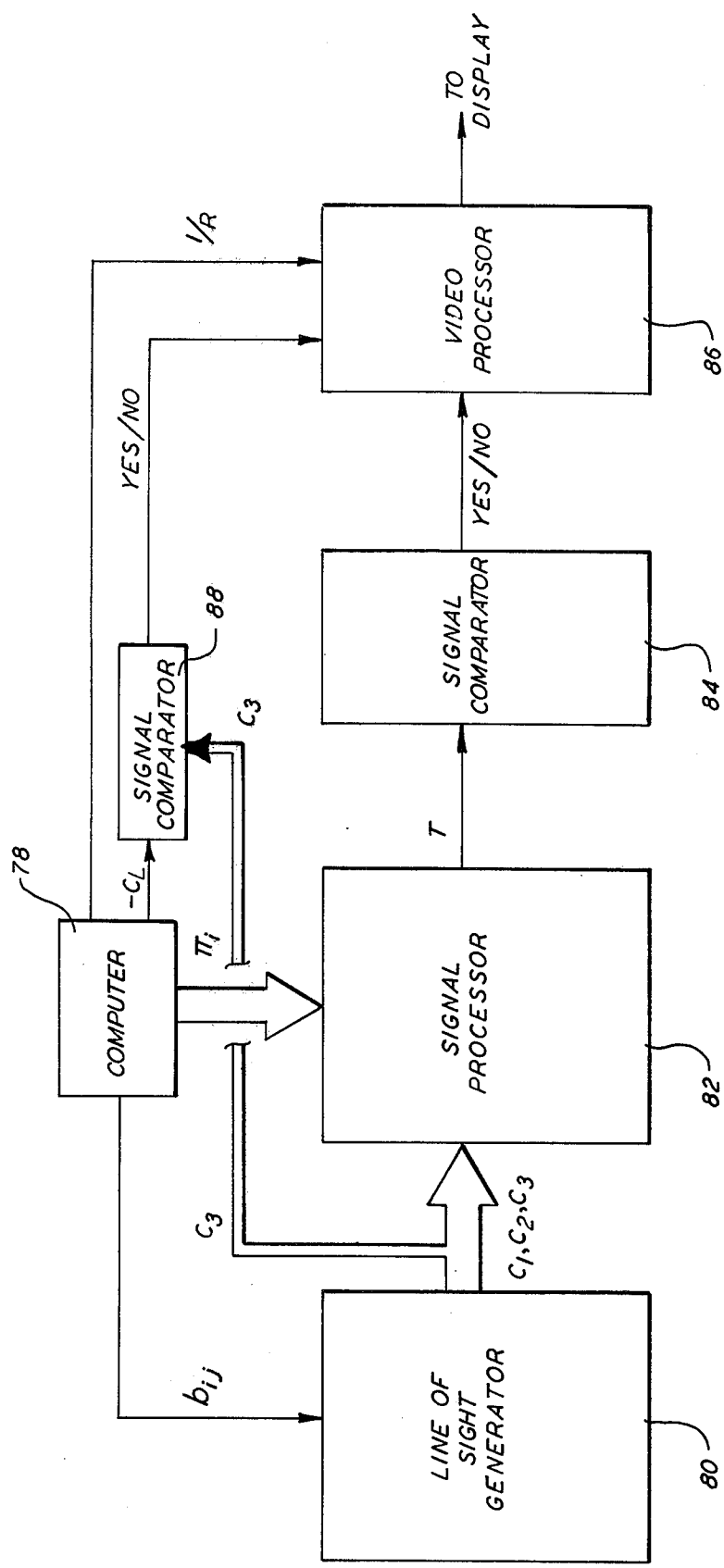
FIG. 8 is a block diagram of the preferred embodiment of the present invention.

Referring to FIG. 8, a system diagram of the present invention is shown. Computer 78 supplies $b_{ij}$ terms to line of sight generator 80 and $\pi_i$ terms to signal processor 82. The line of sight generator 80 fees the $C_1$, $C_2$, and $C_3$ terms to signal processor 82. Signal processor 82 produces a signal representative of the term T. A signal comparator 84 decides whether T≦0 and produces a "yes" or "no" decision signal. Video processor 86 accepts and converts the decision signal to a signal which will modulate the display of the CRT viewing surface in accordance with the "yes" or "no" decision signal.

In the preferred embodiment of the present invention computer 78 will also transmit a signal designated ($1/R^2$) to the video processor 86 which will cause the intensity of the simulated light spot to vary inversely proportional to the square of the distance from the eyepoint to the ground intersection point of the line of sight. As the distance from the eyepoint to the ground plane increases the illuminated area will become dimmer. Also in the preferred embodiment, the computer will provide a $-C_L$ signal to a second signal comparator 88. $-C_L$ will be a predetermined value which, when compared with $C_3$, the ground axis direction number corresponding to the $\beta$ angle of the line of sight 54 as shown in FIG. 5, will establish that the line of sight does not intersect a point on the ground plane and hence no display illumination should appear in that direction.

Figure 11:
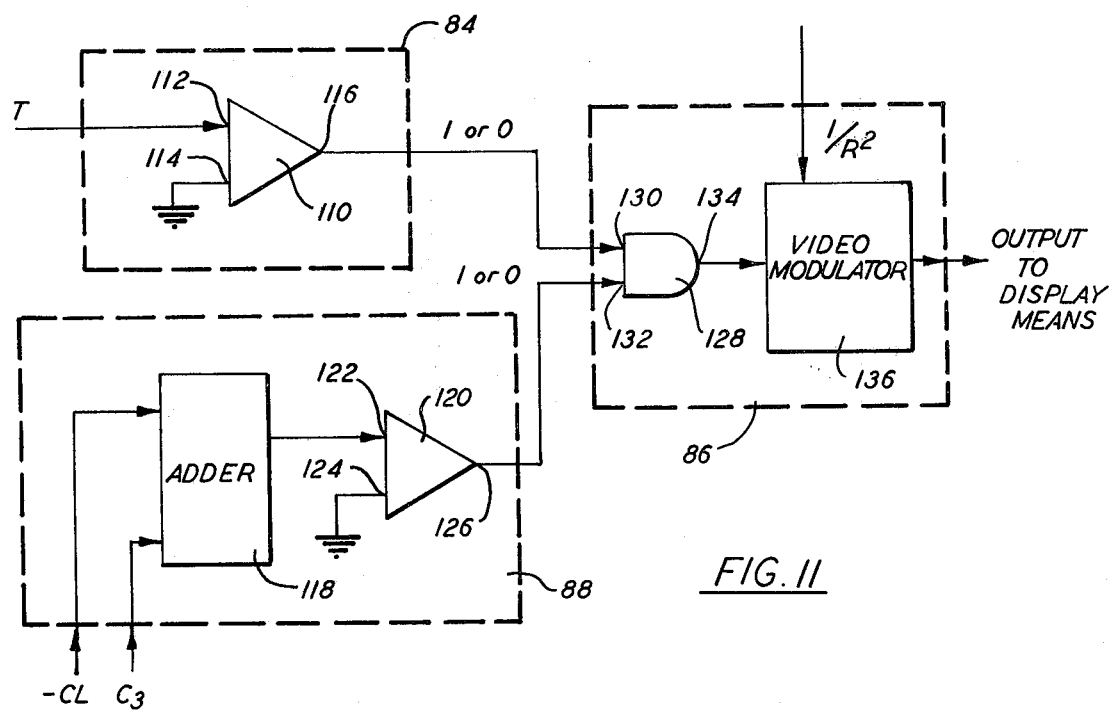
FIG. 11 is a block diagram showing first and second signal comparators and a video processor as used in the preferred embodiment of the present invention.
Figure 9:
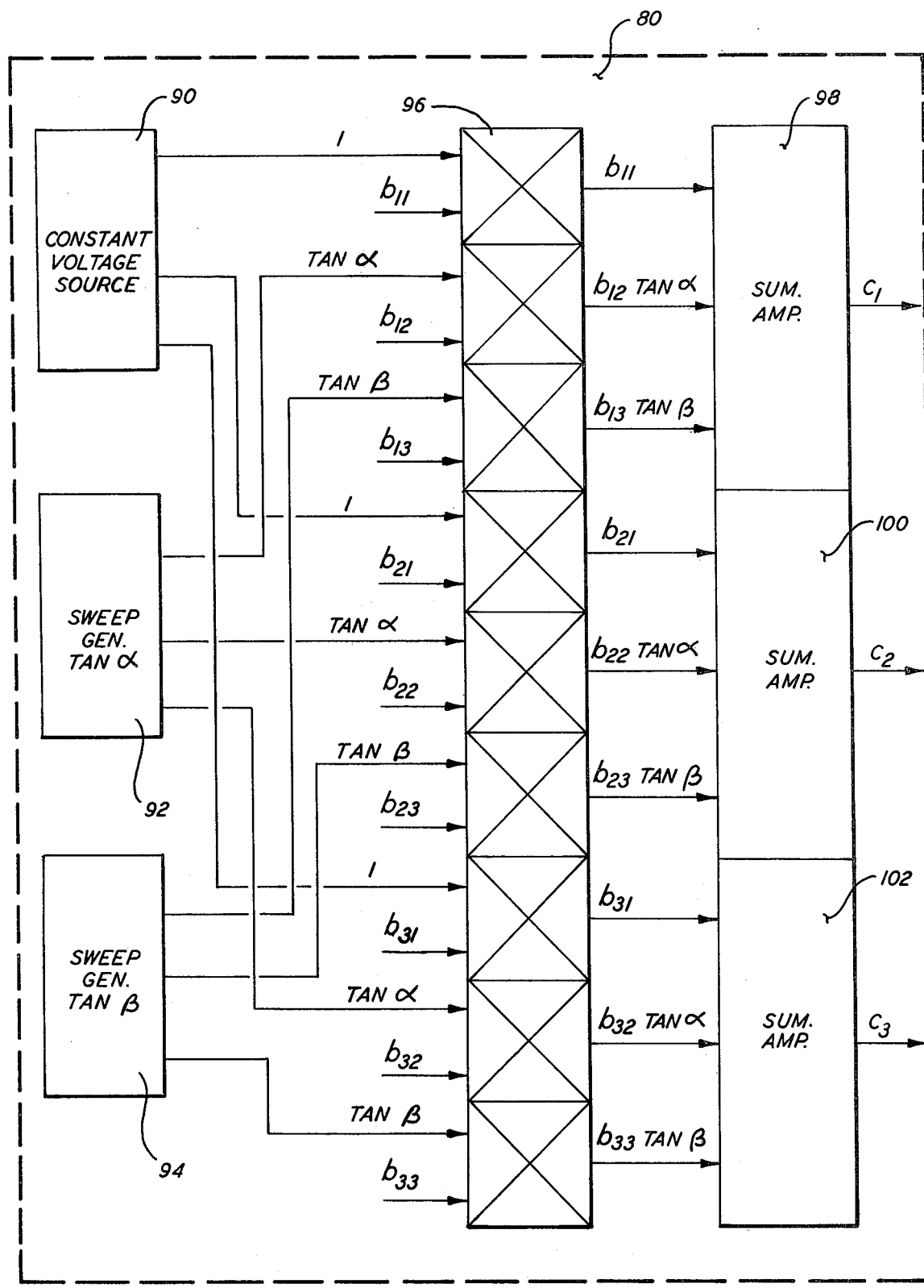
FIG. 9 is a block diagram of a line of sight generator employed by the present invention.
Figure 10:
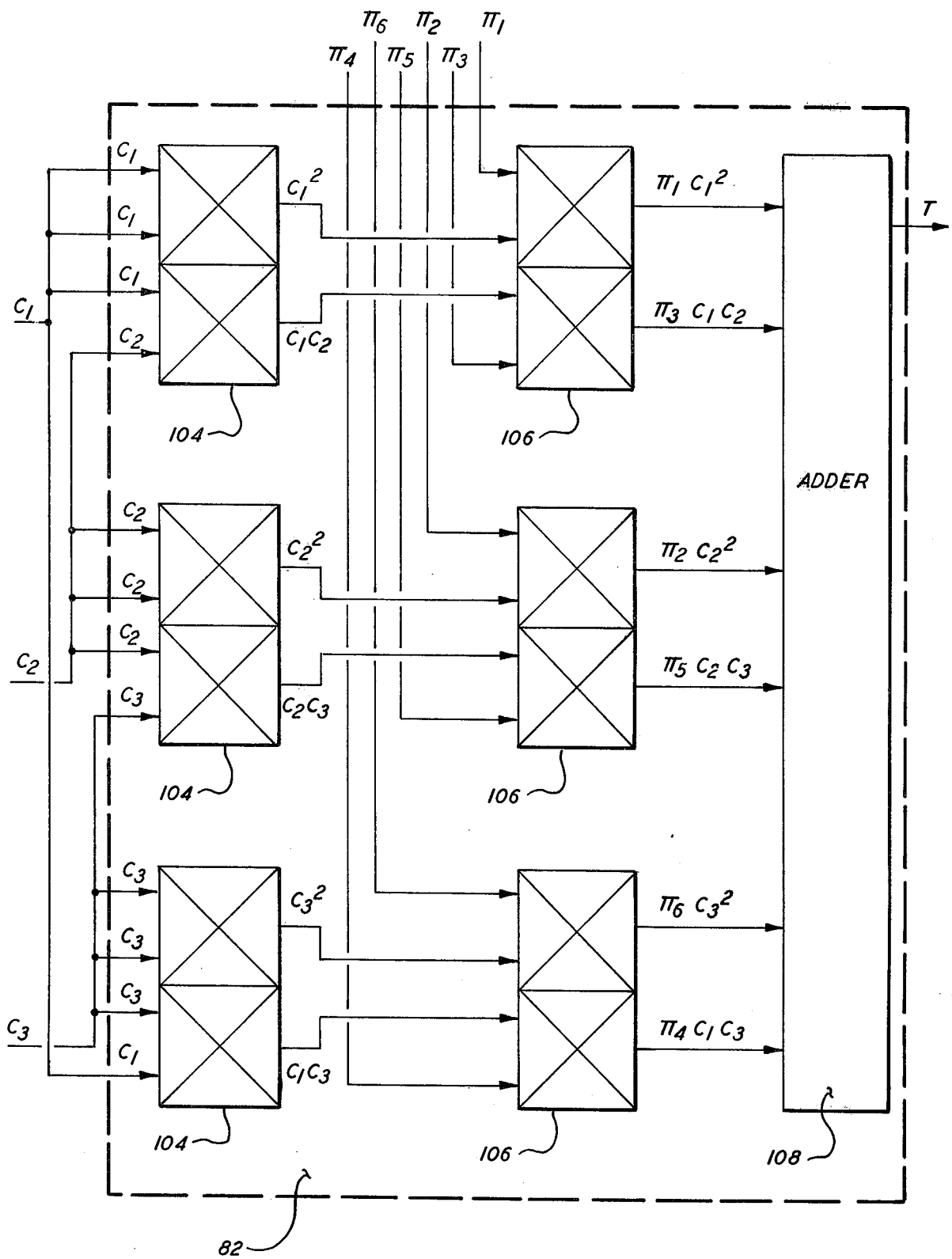
FIG. 10 is a block diagram of a signal processor employed by the present invention.

FIGS. 9, 10, and 11 show in detail the specific components used in the preferred embodiment of the present invention.

FIG. 9 shows line of sight generator 80. Voltage source 90 produces a constant voltage level value of 1. Sweep generator 92 produces tan $\alpha$ signal. Sweep generator 94 produces tan $\beta$ signal. A row of nine multipliers 96 accept signals from source 90 and sweep generators 92 and 94 and also accept signals representative of each $b_{ij}$ term from the computer 78 (not shown). The two signals input to each multiplier of row 90 are multiplied to produce nine output signals, one from each of the multipliers, representing the terms $b_{11}$, $b_{12}$ tan $\alpha$, $b_{13}$ tan $\beta$, $b_{21}$, $b_{22}$ tan $\alpha$, $b_{23}$ tan $\beta$, $b_{31}$, $b_{32}$ tan $\alpha$, $b_{33}$ tan $\beta$. Summing amplifier 98 combines $b_{11}$, $b_{12}$ tan $\alpha$ and $b_{13}$ tan $\beta$ to produce a signal representing $C_1$. Summing amplifier 100 combines $b_{21}$, $b_{22}$ tan $\alpha$ and $b_{23}$ tan $\beta$ to produce a signal representing $C_2$. Summing amplifier 102 combines $b_{31}$, $b_{32}$ tan $\alpha$, $b_{33}$ tan $\beta$ to produce a signal representing $C_3$.

FIG. 10 illustrates signal processor 82. Signals $C_1$, $C_2$ and $C_3$ are fed to respective inputs of pairs of multipliers 104. Each of the multipliers of pairs 104 multiply the signals incident upon it to produce signals representing the terms $C_1^2$, $C_1C_2$, $C_2^2$, $C_2C_3$, $C_3^2$, and $C_1C_3$. Second pairs of multipliers 106 accept the signals output from multipliers 104 and also receive $\pi_1$, $\pi_2$, $\pi_3$, $\pi_4$, $\pi_5$, $\pi_6$ signals from the computer 78 (not shown). Each of the multipliers 106 multiply the signals incident upon it to produce signals representing the terms $\pi_1 C_1^2$, $\pi_3 C_1 C_2$, $\pi_2 C_2^2$, $\pi_5 C_2 C_3$, $\pi_6 C_3^2$ and $\pi_4 C_1 C_3$. Adder 108 combines each of the signals output from multipliers 106 to produce a signal representing the term T.

Referring to FIG. 11, a signal representing T is fed to signal comparator 84. Signal comparator 84 employs a voltage comparator 110, one port 112 of which accepts signal T. A second port 114 is held at a ground potential. If signal T has a voltage value equal to or less than the 0 voltage value at ground or some other predetermined value, comparator 110 will produce a digital pulse at port 116 representing a "yes," which specifies that $T \leq 0$ and that the location of the ground plane intersection point is within the illuminated area. If $T < 0$, then no digital pulse will appear at port 116 representing a "No," which specifies that the location of the ground plane intersection point is outside the illuminated area.

Still referring to FIG. 11, a second signal comparator 88 receives a $C_3$ signal from line of sight generator 80 (not shown). It also receives a $-C_L$ signal from computer 78 (not shown). The $-C_L$ signal represents a voltage level corresponding to a geometrical location above the ground plane whereby a line of sight projected from the eyepoint above this location will not intersect the ground plane. For example, if, for the case of a horizontal ground reference plane, the line of sight is looking at the horizon there will be no ground plane intersection point and hence no need to display any illumination in that direction. Adder 118 receives the $-C_L$ and $C_3$ signals and combines them. The output from adder 118 is fed to one input port 122 of voltage comparator 120. The other input port 124 of voltage comparator 120 is held at ground potential or some other predetermined value. If the difference signal from adder 118 is $\leq 0$, then comparator 120 will produce a pulse at port 126 representing a "yes" which specifies that the $C_3$ signal is below the level above which the line of sight will not intersect the ground plane. If the difference from adder 118 is $<0$, then no digital pulse will appear at port 126 representing a "No," which specifies that the line of sight is looking in a direction which will not intersect the ground plane.

Again referring to FIG. 11, a video processor 86 accepts signals from signal comparators 84 and 88 and also a $(1/R^2)$ signal from the computer 78 (not shown). An "and" gate 128 will generate an analog signal when two digital pulses are incident upon its input ports 130 and 132. Voltage comparator output 116 feeds one input port 130 and voltage comparator output 126 feeds second input port 132. When $T \leq 0$ and when the line of sight intersects the ground plane a digital pulse will be present at each input port of "and" gate 128 and an analog output will be produced at "and" gate output port 134. When an output is forthcoming from port 134 video processing of the signal on the television display is necessary, as the illuminated ground area is then being viewed. A video modulator 136, well-known to those skilled in the television art, can accept the analog signal from "and" gate 128 and modulate the CRT beam to change the television display (not shown) to present the illuminated area being viewed. The video modulator 136 can also be responsive to the $(1/R^2)$ signal produced by computer 78 (not shown) where the $(1/R^2)$ signal will designate that, as the distance from the eyepoint to the ground plane changes, the intensity of the illumination diminishes.

It should be noted that the $(1/R^2)$ signal and signal comparator 88 are not necessary elements for practicing the invention but are included to describe the preferred embodiment.

The output signal from voltage comparator 110 could be transmitted to the video processor 86 which would have a digital to analog converter in place of "and" gate 128 when signal comparator 88 is not employed. The digital to analog converter would accept a "yes" pulse from voltage comparator 110 and generate an analog output to video modulator 136 in the same manner as "and" gate 128.

This invention has been described in terms of a light source located aboard an aircraft illuminating a ground plane, such as a runway, so that the pilot within the aircraft can look through his aircraft window and view the illuminated ground area. However, it will be readily apparent to those skilled in the art that this invention can be practiced where any directed source of light intersects a surface plane. For example, a sailor in a boat on the water can view a light house beam as it illuminates the surface of the water. A soldier within a tank can shine a spotlight on the vertical plane surface of a building and view the building surface; or, a driver of a motor vehicle can view the illumination of the road ahead caused by his vehicle's headlights. It will also be apparent to those skilled in the art that various changes and modifications may be made without departing from the invention. For instance, multiple light sources can be simulated where the video processing merely combines the individual light sources and increases the illumination at areas where overlap occurs. The invention is, therefore, intended to cover all such changes and modifications as fall within the true spirit and scope of the invention as defined by the appended claims.

What is claimed is:

1. Apparatus for providing on a viewing surface of a raster scan television display a simulated view from an eyepoint of a changeable illuminated area located on a plane surface where the source of illumination is a cone of light, whose orientation can be varied, whose apex can be located at any distance from said eyepoint and said plane surface, and whose conical surface intersects said plane surface comprising:
   a. means for generating first signals representative of changeable relative geometrical relationships between locations and orientations of said plane surface, said eyepoint, and said cone of light;
   b. means for generating second signals representative of the position on said viewing surface of a line of sight from said eyepoint through said viewing surface to a plane surface intersection point;
   c. a signal processor receiving and combining said first and second signals such that a third signal is generated representative of the location of the line of sight plane surface intersection point relative to a conic section generated by the intersection of the cone of light with the plane surface;
   d. a signal comparator responsive to said third signal which determines whether said plane surface intersection point lies within, on, or outside said conic section; and
   e. a video processor responsive to said signal comparator for modulation of said raster scan display, whereby the video modulation creates an illuminated area on the viewing surface corresponding to the plane surface intersection point when said point lies within or on the said conic section.

2. The apparatus of claim 1 wherein said means for generating said first signals comprises computer means, responsive to the position of the eyepoint relative to the cone of light and responsive to the position of the eyepoint relative to the plane surface, which generates said first signals such that the position of the eyepoint and the position of the cone of light can be defined relative to the plane surface.

3. The apparatus of claim 2 wherein said means for generating said second signals comprises:
   a. means for generating signals representative of line of sight direction numbers which define the displayed line of sight relative to the said display viewing surface;
   b. means for generating signals representative of display to ground direction cosines which allow the display viewing surface to be defined relative to the plane surface; and
   c. arithmetic means for combining said signals representative of said display to ground direction cosines with said signals representative of said line of sight direction numbers for converting said line of sight direction numbers into ground axes direction numbers which are representative of the position on said viewing surface of a line of sight from said eyepoint through said viewing surface to a plane surface intersection point.

4. The apparatus of claim 3 wherein said signal comparator comprises first voltage comparison means such that when said third signal incident upon the comparator is within a first predetermined voltage range, which defines whether said plane surface intersection point is within or on said conic section, an output signal from said first voltage comparison means will be generated indicating that the intersection point is within or on said conic section.

5. The apparatus of claim 4 further comprising means to provide a signal to said video processor representative of the distance from the eyepoint to said plane surface intersection point so that the brightness of the illuminated area on the viewing surface corresponding to the plane surface intersection point can be regulated, whereby as the distance from the eyepoint to said plane surface intersection point increases, the illumination intensity decreases.

6. The apparatus of claim 4 further comprising a second signal comparator which comprises:
   a. means for providing a signal representative of a position above the plane surface beyond which the line of sight no longer intersects the plane surface;
   b. signal combining means receptive of one of said second signals which is representative of the line of sight position on said viewing surface normal to the plane surface, and receptive of said signal representative of a position above the plane surface, within which a difference signal is generated; and
   c. a second voltage comparison means receiving said difference signal such that when the difference signal is within a second predetermined voltage range an output signal from said second voltage comparison means will be generated indicating that the line of sight will in fact intersect the plane surface.

7. The apparatus of claim 6 wherein said video processor comprises:
   a. "and" gate means responsive to said signal output from said second voltage comparison means and said first voltage comparison means whereby an output signal will be generated from said gate means when both said first and second output signals from said voltage comparison means are incident upon the said gate means; and
   b. video modulation means, responsive to said "and" gate means output signal, for modulating the CRT beam raster scan such that the instantaneous television display will present the illuminated area being viewed.

8. A method for providing on a viewing surface of a raster scan television display a simulated view from an eyepoint of a changeable illuminated area located on a plane surface where the source of illumination is a cone of light, whose orientation can be varied, whose apex can be located at any distance from said eyepoint and said plane surface, and whose conical surface intersects said plane surface comprising the steps of:
   a. generating first signals representative of changeable relative geometrical relationships between locations and orientations of said plane surface, said eyepoint, and said cone of light;
   b. generating second signals representative of the position on said viewing surface of a line of sight from said eyepoint through said viewing surface to a plane surface intersection point;
   c. combining said first and second signals such that a third signal is generated representative of the line of sight plane surface intersection point relative to a conic section generated by the intersection of the cone of light with the plane surface;

d. determining whether said third signal indicates that the plane surface intersection point lies within, on, or outside said conic section; and e. video processing the video signals of the raster scan display on the basis of said determination of step d such that an illuminated area on the viewing surface of the raster scan display is created corresponding to the plane surface intersection point within or on said conic section.

9. The method of claim 8 wherein the step of generating first signals comprises the steps of:

a. generating signals representative of line of sight direction numbers which define the displayed line of sight relative to the said display viewing surface;

b. generating signals representative of display to ground direction cosines which allow the display viewing surface to be defined relative to the plane surface; and c. combining said signals representative of line of sight direction numbers and said signals representative of display to ground direction cosines for converting said line of sight direction numbers into ground axes direction numbers which are representative of the position on said viewing surface of a line of sight from said eyepoint through said viewing surface to a plane surface intersection point.

10. The method of claim 9 wherein the step of determining whether said third signal indicates that the plane surface intersection point lies within, on, or outside said conic section comprises the steps of:

a. determining whether said third signal is within a first predetermined voltage range which defines whether said plane surface intersection point is within, or on said conic section; and b. generating an output signal indicating that the plane surface intersection point is in fact within or on said conical section when said third signal is within the said first predetermined voltage range.

11. The method of claim 10 further comprising the step of providing a signal for video processing representative of the distance from the eyepoint to said plane surface intersection point so that the brightness of the illuminated area on the viewing surface corresponding to the plane surface intersection point can be regulated whereby as the distance from the eyepoint to said plane surface intersection point increases, the illumination intensity will decrease.

12. The method of claim 10 further comprising the steps of:

a. providing a signal representative of a position above the plane surface beyond which the instantaneous line of sight no longer intersects the plane surface;

b. generating a signal representing the difference between one of said second signals, which is representative of the line of sight position on said viewing surface normal to the plane surface, and said signal representative of a position above the plane surface;

c. determining whether said difference signal is within a second predetermined voltage range which defines whether the line of sight will in fact intersect the plane surface; and d. generating an output signal indicating that the line of sight intersects the plane surface when said difference signal is within said second predetermined voltage range.

13. The method of claim 12 wherein the step of video processing comprises the steps of:

a. applying said signal output from said first voltage comparison means and said signal output from said second voltage comparison means to "and" gate means such that an output signal will be generated from said gate means when both said first and second output signals from said voltage comparison means are incident upon said gate means; and b. feeding said "and" gate output signal to video modulation means for modulating the CRT beam raster scan such that the television display will present the illuminated area being viewed.

14. A method for providing on a viewing surface of a raster scan television display a simulated view from an eyepoint of a conic section and surface within the section generated on a plane surface by the intersection of a cone with said plane surface, comprising the steps of:

a. defining the conic section located on the plane surface;

b. defining a line of sight from said eyepoint through the viewing surface of the raster scan television display to the plane surface;

c. determining the location of a line of sight intersection point on the plane surface;

d. comparing the line of sight intersection point with the defined conic section to determine whether the intersection point lies within, on, or outside the conic section; and e. presenting upon the viewing surface a display corresponding to the conic section and surface within the section when the line of sight intersection points lie within or on the conic section.

* * * * *

UNITED STATES PATENT AND TRADEMARK OFFICE
CERTIFICATE OF CORRECTION

PATENT NO. : 4,177,579
DATED : December 11, 1979
INVENTOR(S) : David L. Peters et al It is certified that error appears in the above-identified patent and that said Letters Patent are hereby corrected as shown below:

Column 9, line 55, delete the symbol "$<$" and substitute therefor -- $>$ --

Column 10, line 9, delete the symbol "$\leqq$" and substitute therefor -- $\leq$ -- line 13, delete the symbol "$<$" and substitute therefor -- $>$ --;

line 24, delete the symbol "$\leqq$" and substitute therefor -- $\leq$ --

Signed and Sealed this

Tenth Day of June 1980

[SEAL]

Attest:

Attesting Officer

SIDNEY A. DIAMOND

Commissioner of Patents and Trademarks